(No Model.) 6 Sheets—Sheet 2.
H. WRIGHT.
PORTABLE SAW MILL.
No. 332,690. Patented Dec. 15, 1885.
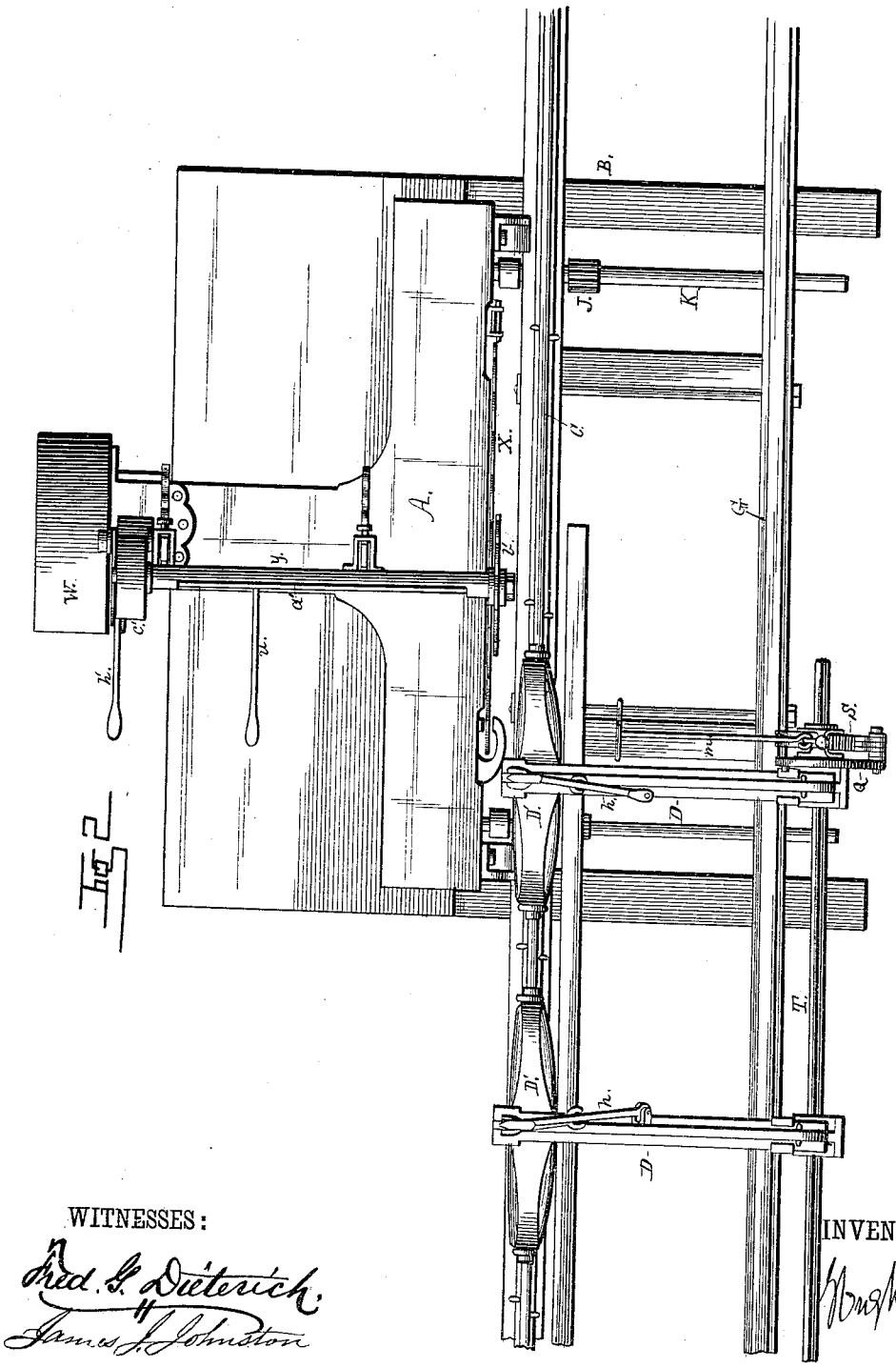
WITNESSES:
Fred. G. Dieterich
James L. Johnston
INVENTOR.
Hugh Wright (No Model.) 6 Sheets—Sheet 3.
H. WRIGHT.
PORTABLE SAW MILL.
No. 332,690. Patented Dec. 15, 1885.
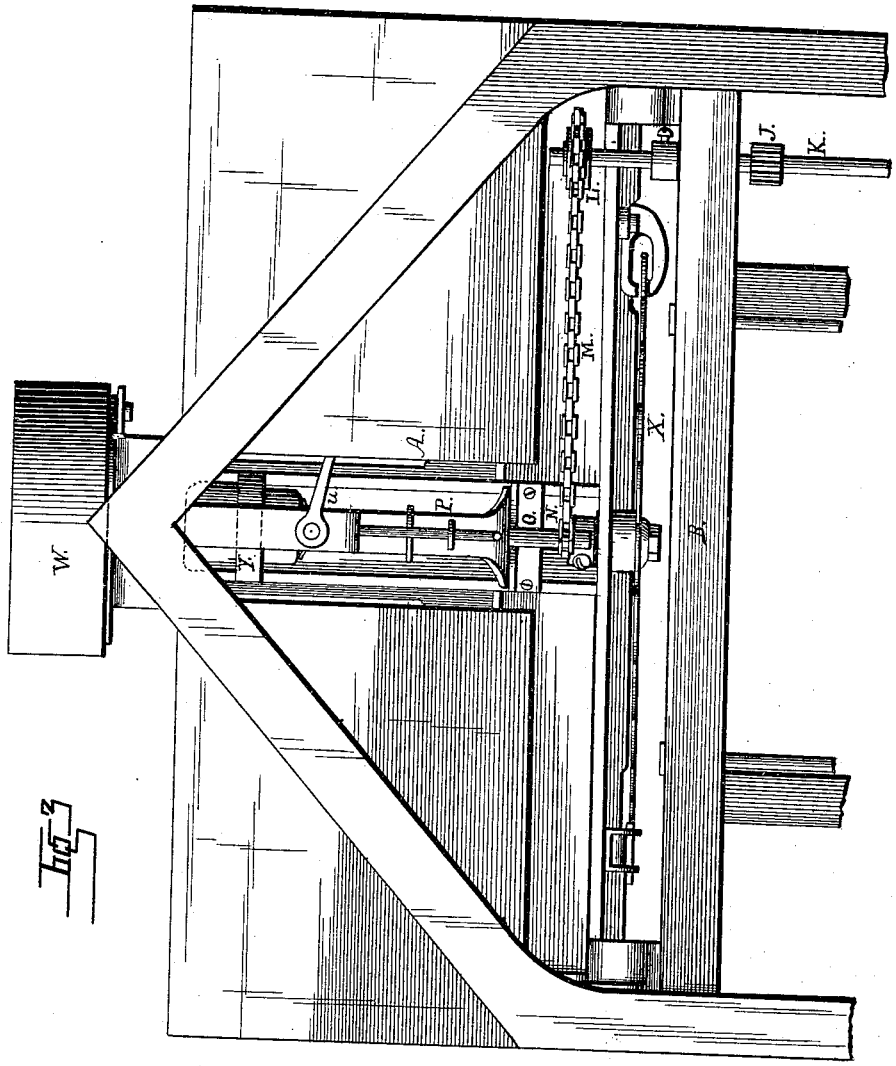
WITNESSES:
INVENTOR.

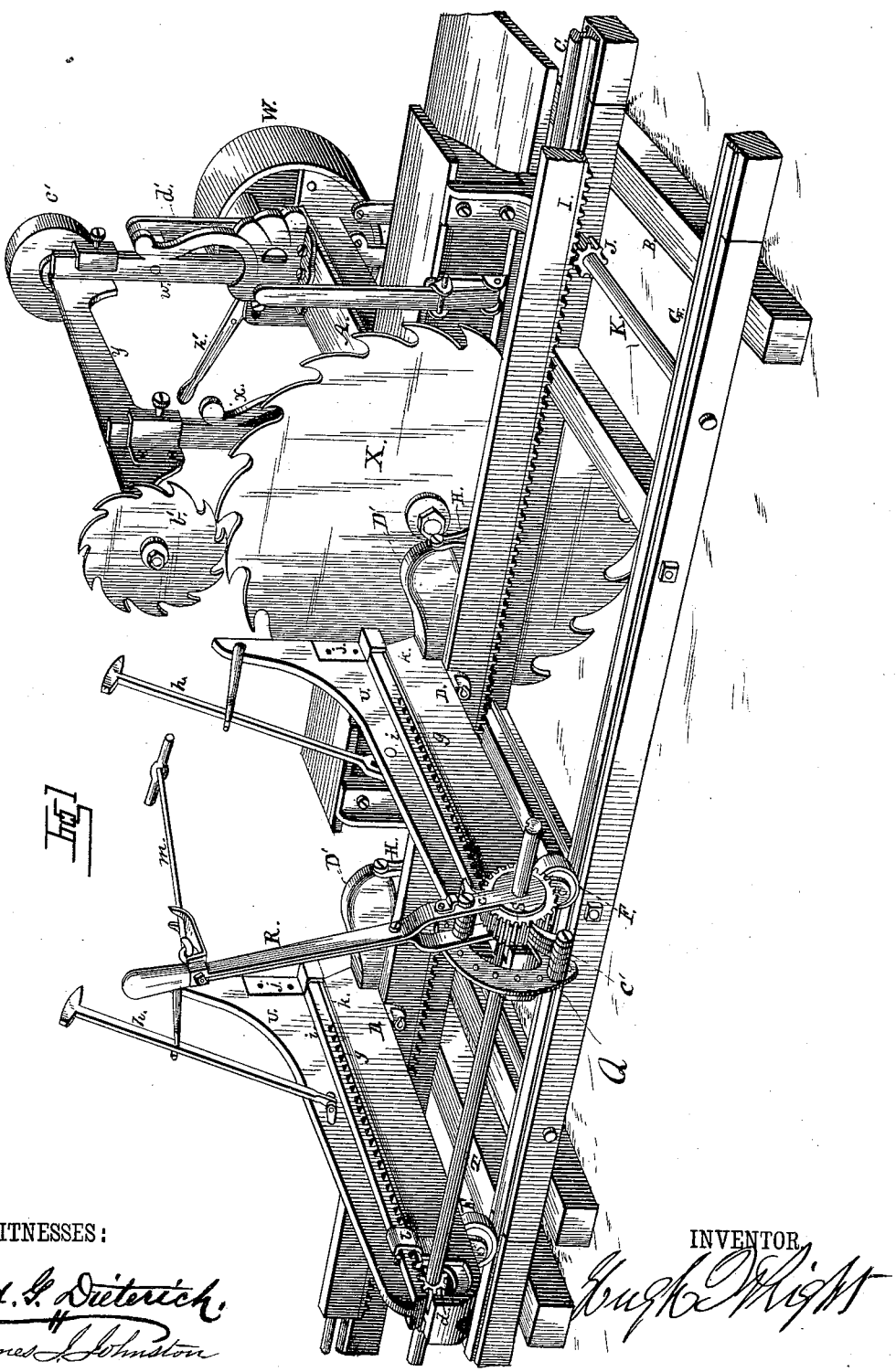

(No Model.)  H. WRIGHT.  6 Sheets—Sheet 4.
PORTABLE SAW MILL.
No. 332,690.  Patented Dec. 15, 1885.
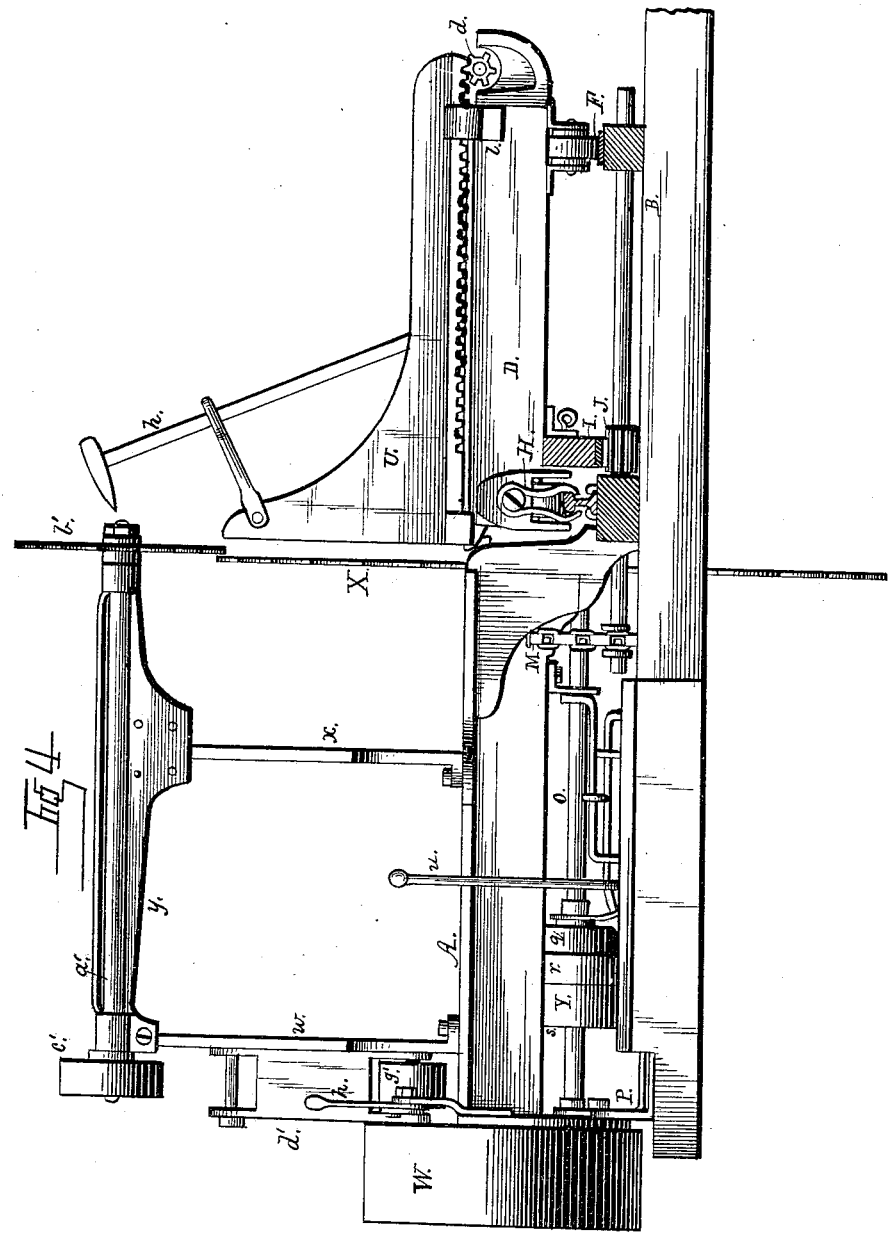
WITNESSES:  INVENTOR.

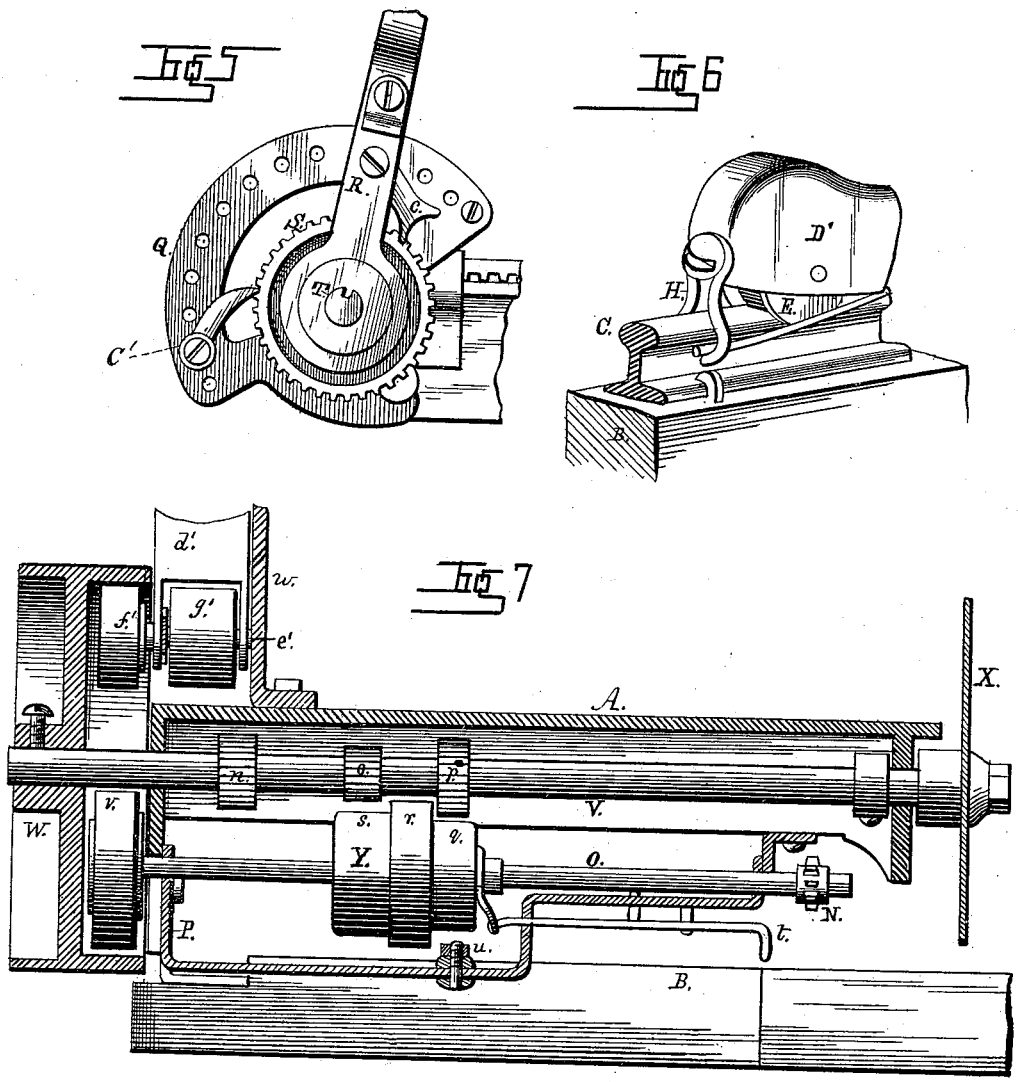

(No Model.) 6 Sheets—Sheet 6.
H. WRIGHT.
PORTABLE SAW MILL.
No. 332,690. Patented Dec. 15, 1885.
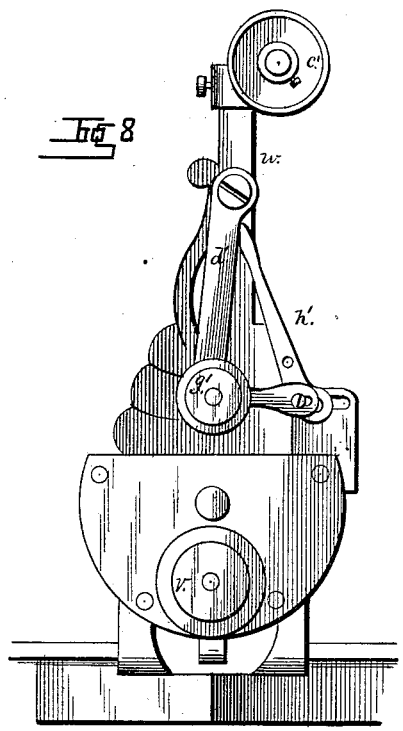
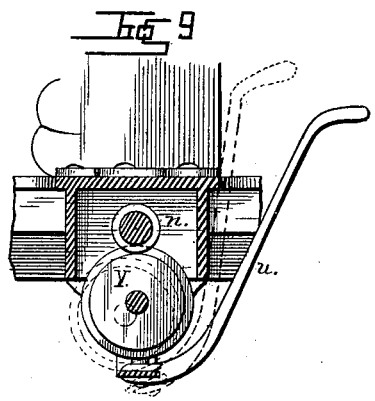
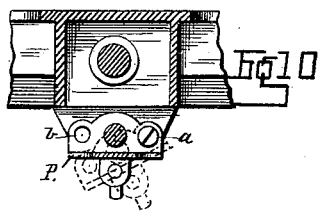
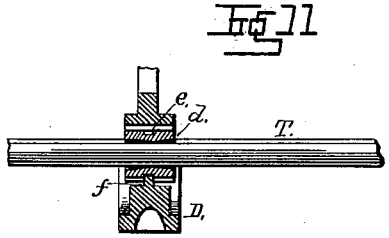
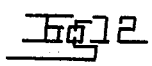
WITNESSES:   INVENTOR.

UNITED STATES PATENT OFFICE.

HUGH WRIGHT, OF NEW LISBON, OHIO.

PORTABLE SAW-MILL.

SPECIFICATION forming part of Letters Patent No. 332,690, dated December 15, 1885.

Application filed December 29, 1883. Serial No. 115,899. (No model.)

*To all whom it may concern:*

Be it known that I, HUGH WRIGHT, of New Lisbon, in the county of Columbiana and State of Ohio, have invented a new and useful Improvement in Portable Saw-Mills; and I do hereby declare that the following is a full, clear, and exact description thereof, reference being had to the accompanying drawings, and to the letters of reference marked thereon.

My invention has for its object the construction of a light, strong, durable, and efficient portable saw-mill, with economy of material and in cost of construction.

My invention consists in the peculiar construction, combination, and arrangement of the several parts which enter into the construction of the improvement of the new and portable saw-mill, which will be hereinafter more fully described.

To enable others skilled in the art with which my invention is most nearly connected to make and use it, I will proceed to describe its construction and operation.

In the accompanying drawings, which form part of this specification, Figure 1 is a perspective view of my improvement in portable saw-mills. Fig. 2 is a top view or plan of the same. Fig. 3 is an inverted view of the saw-frame. Fig. 4 is an end elevation of said mill. Figs. 5, 6, 7, 8, 9, 10, 11, and 12 are detail views.

Reference being had to the accompanying drawings, A represents the frame of the saw, which frame is constructed of cast-iron, and its form is clearly indicated in Figs. 2, 3, 7, and 8, and is of such form and construction that it covers and incloses the driving mechanism employed for the "feed" of the mill. By this form and construction of the frame A the said driving mechanism and the main shaft for the saw are covered, inclosed, and protected from rain, snow, sawdust, falling pieces of timber, and all liability to accident or tripping of the operator. The frame A is secured to the track or way B, the inner timber of which is provided with a T-rail of iron, (marked C.) Said track or way may be constructed in a series of sections, secured together by any means known to the art, and may be of any length desired. The head-blocks D in outline are T-shaped, and are concaved on their under side for the purpose of economy of material and lightness, and are provided with two friction-rollers, E, having double flanges, which straddle the head or tread of the iron T-rail C, as shown in Fig. 6. The head-blocks D are also provided at their outer end with a friction-roller, F, having a plain tread, which travels on a flat iron rail, G, secured on the outer timber of the track or way B. To the ends of the inner limbs of the head-blocks D are secured yokes H, which straddle the head or tread of T-rail C, and are employed for the purpose of preventing the displacement of the head-blocks D. To the under side of the head-blocks D is attached a feed-rack, I, into the teeth of which mesh the teeth of a pinion, J, mounted on the shaft K, on the inner end of which is a "sprocket-wheel," L, which is operated through the medium of the endless chain M, which passes over a sprocket-wheel, N, on the shaft O, journaled in a pivoted frame, P, (shown in Figs. 4 and 7,) which pivoted frame P is provided with double pivot-points, (marked $a\,b$.) (Shown in Fig. 10.) This arrangement of the double pivot-points $a\,b$ for the pivoted frame P adapts it for either a right or left handed mill. To the forward head-block is attached a graduating-arch, Q, provided with a large number of openings for the reception of a stop-pin for regulating the stroke of the lever R and throw of the pawl $c$. To the graduating-arch Q is pivoted one or more stop-pawls, $c'$, for holding the wheel S in a fixed position after each movement of it by the lever R and pawl $c$. The wheel S is mounted on the set shaft or rod T, which is provided with a longitudinal groove, into which is fitted a tongue in the bore of the wheel S. The set-rod T may be of any desired length for adapting the mill to the sawing of lumber of different lengths. On the set shaft or rod T are pinions $d$, the bore of which gradually increases in diameter from the center toward each end, for the purpose of allowing said pinions to vibrate on the set shaft or rod T. The bore of each of these pinions $d$ has an inwardly-projecting tongue, which fits in a longitudinal groove in the set shaft or rod T, as shown in Fig. 12. In the periphery of the pinions $d$ is a groove, $e$, into which is fitted a tongue, $f$, formed in the outer ends of the head-blocks D, for the purpose of keeping said pinions in proper position with relation to and in mesh with the gear-teeth $g$ on the under side of the knees U, to which are pivoted the ordinary dogs, $h$. The knees U have side projecting flanges, $i$, and detachable guides $j$, which catch under flanges $k$, for the purpose of preventing the forward end of the knees U from vertical lift. On the outer end of the head-blocks D are detachable guides $l$, which catch over the upper side of the projecting flanges $i$ of the knees U, for holding the outer end of said knees down on the head-blocks D.

By the hereinbefore-described construction and arrangement of the set mechanism the skillful sawyer can cut lumber of any desired gage.

By the peculiar arrangement of the knees and their guides herein described they are not liable to become clogged with ice in wet and freezing weather.

The great advantage in operating a saw-mill (when it is not under shelter) with a free-acting set mechanism and without liability of becoming clogged with snow and ice will be apparent to those having experience in operating portable saw-mills.

To the set-lever R is pivoted a secondary set-lever, $m$, by means of which the sawyer can operate the set mechanism without the necessity of passing over or around to the opposite side of the mill. On the main saw-shaft V are mounted the main driving-pulley W, pulleys $n\ o\ p$, and saw X. On the shaft O is mounted a differential pulley, Y, having three frictional surfaces (marked $q\ r\ s$) for giving different rates of speed to the shaft O, and thereby giving different rates of speed to the sprocket-wheel L, endless chain M, sprocket-wheel N, shaft K, and pinion J, which meshes into the feed-rack I, and thereby producing different rates of speed for feeding the timber to the saw X. The differential pulley is moved longitudinally on the shaft O through medium of the shifting-lever $t$.

To the pivoted frame P is attached a lever, $u$, by means of which said frame can be elevated for bringing the different frictional surfaces of the differential pulley Y against the pulleys $n\ o\ p$, as may be determined upon by the sawyer. The pivoted frame P is moved into the position shown in Fig. 9 in dotted lines by lifting the lever $u$, thereby bringing the periphery of the pulley $v$ down on the inner surface of the rim of the main driving-pulley W, (see Figs. 7 and 8,) thereby obtaining a reverse motion of the feed mechanism. The pivoted frame P is elevated by pressing down on the lever $u$, thereby bringing the differential pulley against the pulleys $n\ o\ p$, for the purpose hereinbefore stated.

When it is desired to construct a double saw-mill, two uprights are secured to the frame A, on which uprights $w\ x$ are arranged adjustable journals $y$, constructed in one piece, for carrying the shaft $a'$ of the saw $b'$, which shaft is provided with a driving-pulley, $c'$. To the upright $w$ is pivoted a hanger, $d'$, in the end of which is journaled a shaft, $e'$, upon which are mounted pulleys $f'\ g'$. Over pulleys $g'$ and $c'$ is placed a belt for transmitting motion from the pulley $g'$ to the pulley $c'$, shaft $a'$, and saw $b'$. To the hanger $d'$ is attached an adjustable lever (marked $h'$) for moving the hanger so as to bring the periphery of the pulley $f'$ against the inner surface of the rim of the main driving-pulley W, thereby revolving it, which motion is transmitted to the saw $b'$.

By constructing the head-blocks as herein described great strength is obtained with economy of material; and the form and peculiar construction of the frame A forms a perfect protection for the feed mechanism, gives ample room for the truck used for carrying off the sawed lumber, and at the same time combines strength and lightness in said frame, and enables the manufacturer to construct a light, durable, and efficient saw-mill, with all its parts easily reached for the purpose of lubrication or repair, which, in connection with the advantages hereinbefore mentioned, will supply what is desirable in a portable saw-mill.

The devices employed for feeding the carriage and those for transmitting motion from the main saw-shaft to the small saw are claimed in divisions of this application filed June 17, 1885, Serial Nos. 168,919 and 168,937.

Having thus described my improvement, what I claim as of my invention is—

1. In a saw-mill, the combination, with a trackway consisting of an outer flat rail, G, and an inner T-rail, C, of the head-blocks D and feed-rack I, connecting the same, the said head-blocks having at their outer ends the friction-wheels F, and having at their inner ends hollow cross-extensions D', bearing flanged wheels E, said cross-extensions being also provided at each of their extremities with yokes H, extending beneath the flange of the T-rail, substantially as shown and described.

2. In a saw-mill, the combination, with the head-blocks D and the superjacent knees U, said knees being provided on their under sides with gear rack-teeth $g$, of the set-shaft T, having pinions $d$, engaging with said teeth and splined upon the shaft, the bore of said pinions gradually increasing from their centers toward their ends, the pinions being provided with peripheral grooves $e$, and the head-blocks with corresponding tongues, $f$, fitting therein, substantially as set forth.

3. In a saw-mill, the combination, with the head-block D, having the upper flange, $k$, of the superjacent knee U, provided on its under side with the rack-flange $i$, the head-block being furthermore provided at its outer end with the detachable guide $l$, and the knee being provided at its inner end with the detachable guide $j$, substantially as set forth.

HUGH WRIGHT.

Witnesses:
 WM. E. DYRE,
 JAMES J. JOHNSTON.